UNITED STATES PATENT OFFICE.

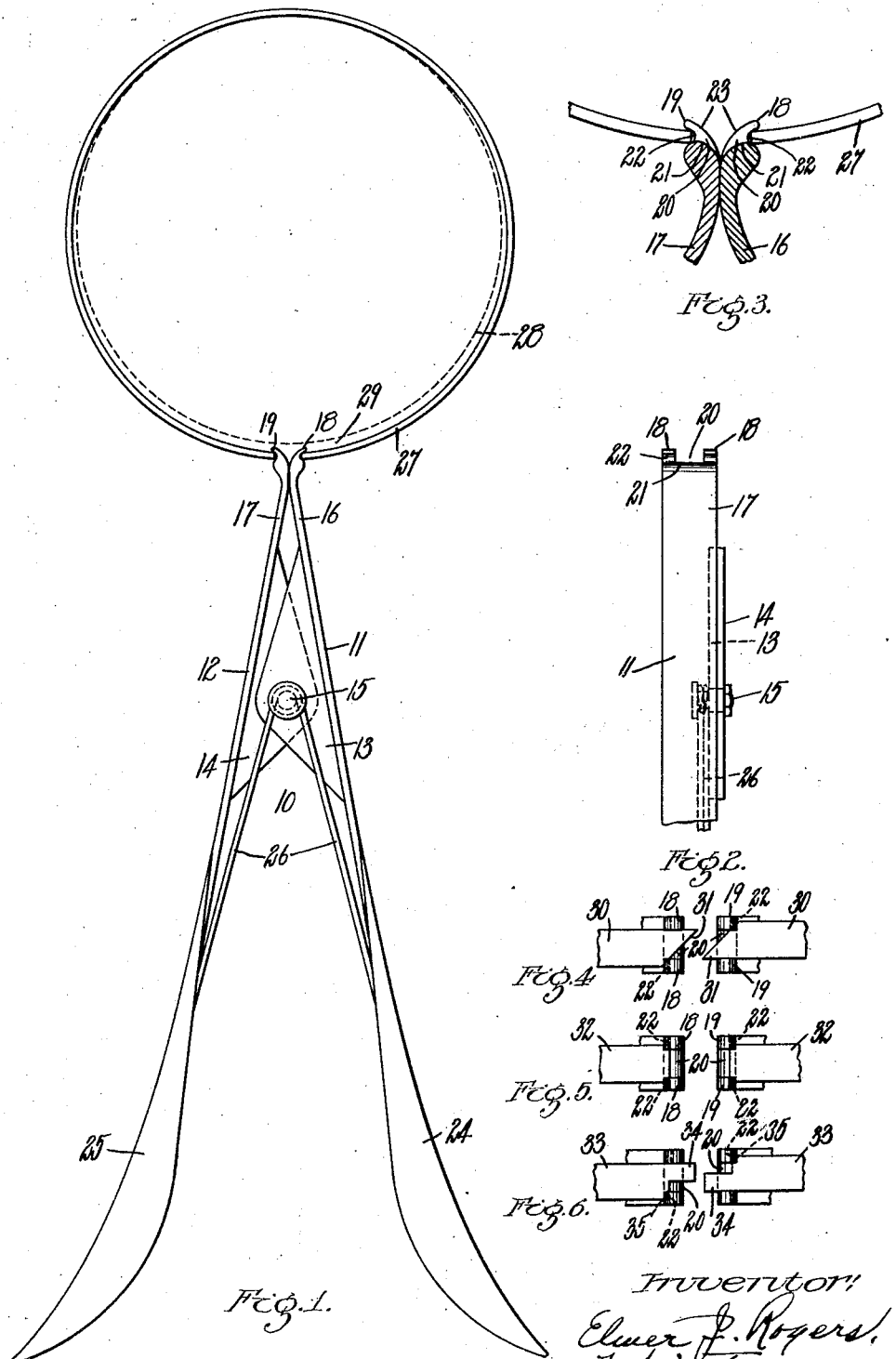

ELMER J. ROGERS, OF QUINCY, MASSACHUSETTS.

PISTON-RING TOOL.

1,406,686.   Specification of Letters Patent.   Patented Feb. 14, 1922.

Application filed February 24, 1920. Serial No. 361,057.

*To all whom it may concern:*

Be it known that I, ELMER J. ROGERS, a citizen of the United States, residing at Quincy, in the county of Norfolk and State of Massachusetts, have invented new and useful Improvements in Piston-Ring Tools, of which the following is a specification.

This invention relates to an improved tool for handling piston rings and especially for placing them in position on the piston of an engine and for removing them from said piston.

The object of the invention is to provide a tool of the character described which will firmly and easily engage the opposite free ends of a split piston ring, whatever may be the shape of said opposite ends, and hold the ring firmly attached to the tool while enabling the ends of the ring to be separated from each other, either in taking the ring off of the piston or in placing it upon the piston.

To these ends the invention consists in a piston ring tool such as hereinafter described in the specification and particularly as pointed out in the claims thereof.

Referring to the drawings, Figure 1 is a front elevation of my improved piston ring tool showing the same in position to spread the opposite ends of a piston ring with the periphery of a piston shown in dotted lines in connection therewith.

Fig. 2 is a side elevation of a portion of the tool with the handles broken away to save space.

Fig. 3 is an enlarged transverse section through the jaws of the tool showing a portion of a piston ring positioned thereon.

Figures 4, 5 and 6 are detailed views illustrating a portion of the jaws of the tool with different shaped ends of piston rings positioned thereon.

Like numerals refer to like parts throughout the several views of the drawings.

In the drawings, 10 illustrates a piston ring tool embodying my invention, the same consisting of two levers 11 and 12, provided with ears 13 and 14 pivoted together by a stud 15; the free ends 16 and 17 of said levers terminate in a pair of hook shaped prongs 18 and 19 respectively, said prongs being separated from each other by a slot 20 extending transversely of said pivot 15, the bottom of which is curved as at 21.

Each of the prongs 18 and 19 is provided with a groove 22 extending transversely of its outer edge end of said slot. The prongs 18 and 19, as will be clearly seen by reference to Figure 3, are convexly curved on their rear edges at 23 and diverge from each other. The levers 11 and 12 are provided with handles 24 and 25 respectively, and these handles are normally held apart by a spring 26 which is mounted upon the stud 15. The handles 24 and 25 being thus normally held apart, it will be seen that the free ends 16 and 17 will normally contact with each other on their rear faces.

The general operation of the tool hereinbefore specifically described is a follows: Assuming that it is desired to remove a piston ring 27, Figures 1 and 3, from a piston 28, the ring is pushed over to one side of the piston, leaving a space 29 between the piston ring and the periphery of the piston, the prong ends of the tool are then inserted between the adjacent ends of the piston ring as illustrated in said figures. The handles 24 and 25 are then brought toward each other thus separating the free ends 16 and 17 of the levers 11 and 12 until the ends of the piston ring are sufficiently spread apart to enable said ring to be removed from the piston.

In placing the ring on the piston the ends of the piston ring are spread apart in the manner hereinbefore set forth, the piston ring is then slid upon the piston until it arrives opposite a groove in its periphery and then the handles are allowed to separate until the free ends 16 and 17 contact with each other, whereupon the piston ring will be positioned upon the piston and the tool is then removed.

The peculiar form of the jaws or free ends of the levers enables the different styles of piston rings to be handled, with ease and certainty.

Some of these different styles are illustrated in connection with the jaws of the tool in Figures 4, 5 and 6. In Figure 4 the adjacent ends of the piston ring 30 are shown cut on an angle and the pointed ends 31 project into the slot 20 between the prongs 18 and 19. The inclined edges of said piston ring also rest in the grooves 22, one of said inclined edges resting in the groove 22 at one side of the tool and the other inclined face resting in the groove 22 on the opposite side of the tool.

In Figure 5, another form of piston ring ends 32 is disclosed in which the ends are cut off square and in this case the ends of the piston ring rest in the grooves 22 on opposite sides of the slot 20.

In Figure 6 the ends of the piston ring 33 are formed with right angle cuts. The portion 34 of each of said piston ring ends projects in this instance through the slot 20 while the portion 35 of each of said piston rings projects into the grooves 22 on opposite sides respectively of the tool.

It will be seen from these different illustrations that the piston ring is held firmly both against circumferential displacement and against lateral displacement upon the tool. The rounded bottom edges 21 of the slots 20 are made of that shape so as to accommodate the tool to different relative positions of the piston ring which is being handled by it.

I claim:

1. A piston ring tool having, in combination, a pair of levers pivoted together, one free end of each of said levers terminating in a pair of prongs, said prongs being provided with transversely extending grooves on their outer edges and located on opposite sides of a slot extending transversely of said grooves and being adapted to engage and hold one free end of a split piston ring.

2. A piston ring tool having, in combination, a pair of levers, a pivot therefor, one free end of each of said levers being provided with a slot extending across its end transversely of said pivot, the bottom of said slot being rounded to form a convex curve whereby said free ends are each provided with a pair of prongs, said prongs being provided on their outer edges with grooves extending transversely of said slot and thereby are adapted to engage and hold one free end of a split piston ring.

In testimony whereof I have hereunto set my hand.

ELMER J. ROGERS.

Witnesses:
FRANKLIN E. LOW,
CHARLES S. GOODING.